(12) United States Patent
Taylor et al.

(10) Patent No.: US 10,769,156 B2
(45) Date of Patent: Sep. 8, 2020

(54) RANK QUERY RESULTS FOR RELEVANCE UTILIZING EXTERNAL CONTEXT

(71) Applicant: MICROSOFT TECHNOLOGY LICENSING, LLC, Redmond, WA (US)

(72) Inventors: Michael Taylor, Cambridge (GB); Torbjorn Helvik, Oslo (NO); Oystein Fledsberg, Trondheim (NO); Lars Hagen, Oslo (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 612 days.

(21) Appl. No.: 15/248,004

(22) Filed: Aug. 26, 2016

(65) Prior Publication Data

US 2018/0060325 A1 Mar. 1, 2018

(51) Int. Cl.
*G06F 16/2457* (2019.01)
*G06F 16/22* (2019.01)
(Continued)

(52) U.S. Cl.
CPC .... *G06F 16/24578* (2019.01); *G06F 16/2228* (2019.01); *G06F 16/951* (2019.01); *G06F 16/9535* (2019.01)

(58) Field of Classification Search
CPC ........... G06F 17/3053; G06F 17/30321; G06F 17/30864; G06F 17/30867;
(Continued)

(56) References Cited

U.S. PATENT DOCUMENTS 7,797,313 B1 9/2010 Goyal et al.
8,224,827 B2 * 7/2012 Dean ................ G06F 17/30864
707/748

(Continued)

FOREIGN PATENT DOCUMENTS

WO 2012166885 A2 12/2012

OTHER PUBLICATIONS

Chau, et al., "A machine learning approach to web page filtering using content and structure analysis", In Journal of Decision Support Systems, vol. 44, Issue 2, Jan. 2008, pp. 482-494.
(Continued)

*Primary Examiner* — Hosain T Alam
*Assistant Examiner* — Saba Ahmed

(57) ABSTRACT

Users are most likely to search for documents "around" them, such as documents which are created, read, or modified by other users they work closely or collaborate with, documents on sites the user frequents, and/or documents trending around them, in addition to documents they've created or interacted with themselves. Therefore, embodiments are directed to relevance ranking of query results based on external context. A search service may receive a query and an external context list, determine a relevance value for each entry in the external context list, and perform the query, where a search index comprising items may be returned in response to performance of the query. The search service may then match entries in the external context list against associated properties of the items, compute a score for the items based on the matching, and rank results of the query based on the score computed for the items.

20 Claims, 10 Drawing Sheets

(51) Int. Cl.
*G06F 16/9535* (2019.01)
*G06F 16/951* (2019.01)

(58) Field of Classification Search
CPC ........... G06F 16/24578; G06F 16/2228; G06F 16/9535; G06F 16/951
USPC ........................................................ 707/711
See application file for complete search history.

(56) References Cited

U.S. PATENT DOCUMENTS

| | | | |
|---|---|---|---|
| 8,296,292 B2 | 10/2012 | Shnitko et al. | |
| 8,694,511 B1* | 4/2014 | Corduneanu | G06F 17/30867 707/723 |
| 8,706,725 B2 | 4/2014 | Bailey et al. | |
| 8,768,932 B1 | 7/2014 | Kacholia et al. | |
| 8,938,463 B1* | 1/2015 | Kim | G06F 17/30867 707/751 |
| 9,092,510 B1* | 7/2015 | Stets, Jr. | G06F 17/30648 |
| 9,110,975 B1* | 8/2015 | Diligenti | G06F 16/951 |
| 10,078,696 B1* | 9/2018 | Sadler | G06F 16/951 |
| 2006/0235873 A1 | 10/2006 | Thomas | |
| 2007/0174872 A1* | 7/2007 | Jing | H04N 5/44543 725/46 |
| 2007/0250468 A1* | 10/2007 | Pieper | G06F 17/3089 |
| 2010/0174712 A1 | 7/2010 | Li et al. | |
| 2012/0158685 A1* | 6/2012 | White | G06F 16/9535 707/706 |
| 2012/0330946 A1 | 12/2012 | Arredondo et al. | |
| 2013/0024448 A1 | 1/2013 | Herbrich et al. | |
| 2013/0110827 A1 | 5/2013 | Nabar et al. | |
| 2013/0166577 A1* | 6/2013 | Barak | G06F 16/9535 707/754 |
| 2013/0191372 A1* | 7/2013 | Lee | G06Q 10/10 707/722 |
| 2014/0032326 A1 | 1/2014 | Li et al. | |
| 2014/0297476 A1 | 10/2014 | Wang et al. | |
| 2014/0330819 A1* | 11/2014 | Raina | G06F 16/9535 707/723 |
| 2015/0058332 A1 | 2/2015 | Patterson et al. | |
| 2015/0248410 A1 | 9/2015 | Stickler et al. | |
| 2016/0026713 A1* | 1/2016 | Katic | H04L 67/104 707/709 |
| 2016/0070764 A1 | 3/2016 | Helvik et al. | |
| 2017/0300495 A1* | 10/2017 | Sharifi | G06F 17/30247 |

OTHER PUBLICATIONS

"International Search Report and Written Opinion Issued in PCT Application No. PCT/US2017/047250", dated Oct. 4, 2017, 14 Pages.

* cited by examiner

RANK QUERY RESULTS FOR RELEVANCE UTILIZING EXTERNAL CONTEXT

BACKGROUND

In an enterprise setting, users are likely to search for documents "around" them, such as documents which are created by other users they work closely or collaborate with, documents associated with sites they often frequent, and/or documents associated with projects or tasks they have worked on, in addition to documents they've created themselves. However, searching via this type of external user context is often not available to search systems. Instead, a user may only be enabled to search in specific locations, like a given folder or collaboration site, for a document, which requires the user to know and remember the location at which the document was stored.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to relevance ranking of query results based on external context. For example, a search service may receive a query and an external context list, determine a relevance value for each entry in the external context list, and perform the query, where a search index comprising items may be returned in response to performance of the query. The search service may then match entries in the external context list against associated properties of the items, compute a score for the items based on the matching, and rank results of the query based on the score computed for the items.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
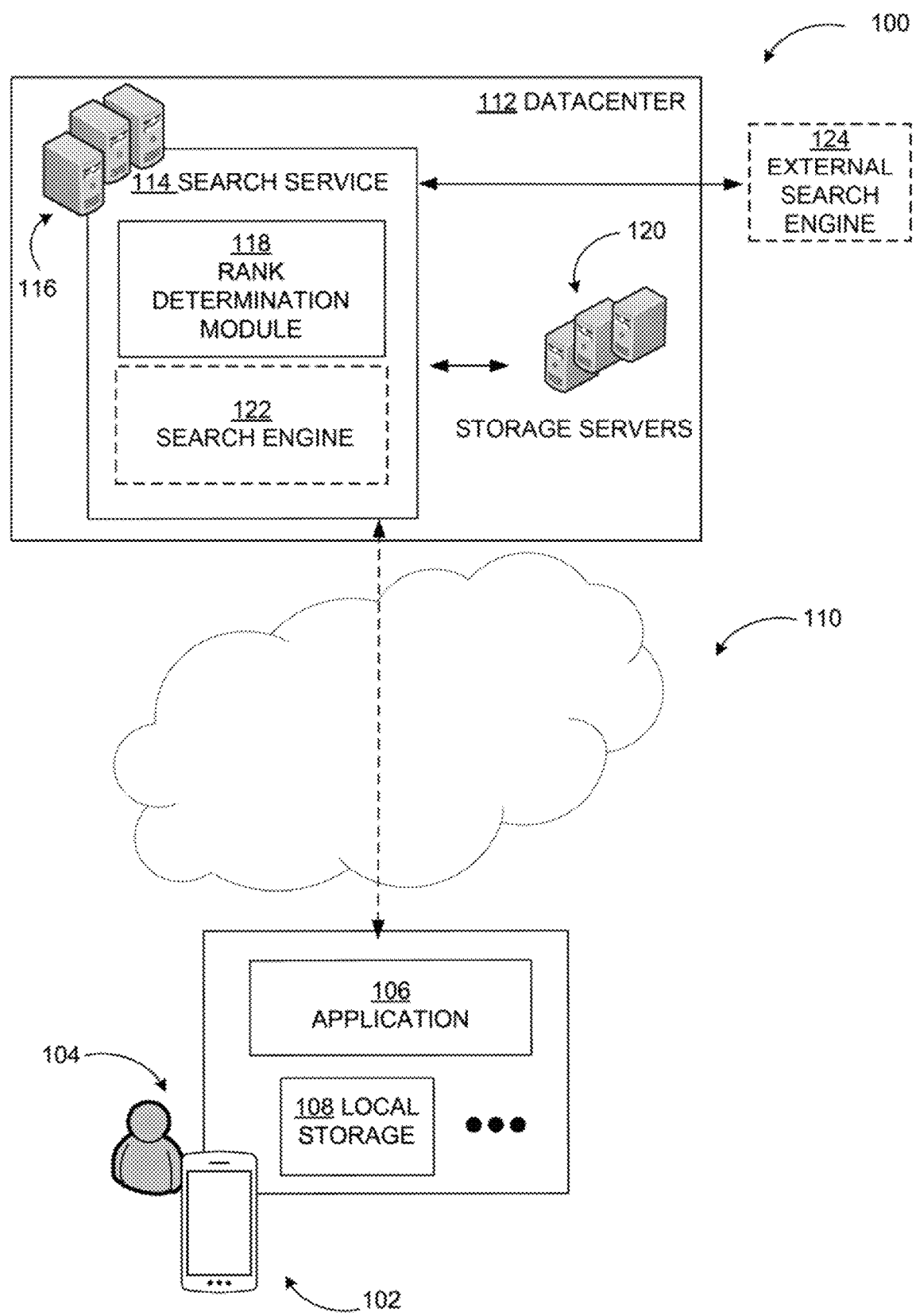
FIG. 1 includes an example network environment where a system configured to rank query results for relevance based on external content may be implemented.

As briefly described above, embodiments are directed to relevance ranking of query results based on external context. For example, a search service may receive a query and an external context list. Entries of the context list may include people, teams, groups, organizations, sites, or tags, for example. The search service may determine a relevance value for each entry in the external context list based on information retrieved from a directory service, a collaboration service, a communication service, and/or a productivity service background framework, where the relevance value may be based on an order of connection, or closeness of relationship, between each entry and a user providing the external context list. The search service may then perform the query, where a search index comprising items may be returned in response to performance of the query. The search service may execute the query at an internal search engine of the search service or may provide the query to an external search engine for execution. The search service may then match entries in the external context list against associated properties of the items, compute a score for the items based on the matching, and rank results of the query based on the score computed for the items.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for relevance ranking of query results based on external content. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example network environment where a system configured to rank query results for relevance based on external content may be implemented.

As illustrated in diagram 100, an example system may include a datacenter 112 hosting a cloud-based search service 114 configured to search one or more databases in order to gather and provide information associated with items that contain or are related to specified terms of a query. The datacenter 112 may include one or more processing servers 116 configured to execute the search service 114, among other components. In some embodiments, at least one of the processing servers 116 may be operable to execute a rank determination module 118 of the search service 114, where the rank determination module 118 may be integrated with the search service 114 to rank query results for relevance based on external context to enable users, such as user 104, to more effectively search for documents around them without requiring the users to know and remember locations in which the documents were stored. In other embodiments, this function may be inherently present within the search service 114 itself. The datacenter 112 may also include one or more storage servers 120 configured to manage one or more data stores comprising data associated with the search service 114 and/or rank determination module 118, such as query results and scores computed to rank the query results. As described herein, the search service 114 and/or rank determination module 118 may be implemented as software, hardware, or combinations thereof.

In some embodiments, the search service 114 may be configured to interoperate with various applications. For example, as illustrated in the diagram 100, the user 104 may execute a thin (e.g., a web browser) or a thick (e.g., a locally installed client application) version of an application 106 through a device 102 with which the search service 114 may be configured to integrate and interoperate with over one or more networks, such as network 110. The application 106 may be an application hosted by the search service 114, for example. The device 102 may include a desktop computer, a laptop computer, a tablet computer, a vehicle mount computer, a smart phone, or a wearable computing device, among other similar devices. A communication interface may facilitate communication between the search service 114 and the application 106 over the network 110.

In an example embodiment, the search service 114 may receive a query and an external context list through the application 106. In some examples, more than one external context list may be received. The application 106 may generate the external context list, where entries of the context list may include people, teams, groups, or organizations that the user 104 works closely with, sites the user 104 frequents often, or tags the user is interested in, among other examples. In one embodiment, the search service 114 may determine a relevance value for each entry in the external context list based on information retrieved remotely from one or more services, such as a directory service, a collaboration service, a communication service, and/or a productivity service background framework. In another embodiment, the application 106 may determine the relevance value by retrieving information stored locally at local storage 108 from similar services executing on the device 102, and provide the relevance values along with the external context list to the search service 114. The relevance value may be based on an order of connection, or a closeness of relationship, between each entry and the user 104. To provide an illustrative example, the external context list may contain people as entries, such as people the user 104 most frequently collaborates with, people on a same team or group as the user 104, and/or people working on a same project, task, or document as the user 104. The search service 114 may retrieve information associated with each person from a directory service and the relevance value may be based on an order of connection between each person and the user 104. In some embodiments, the relevance value for an entry of the external context list may be modified in response to detecting a change in connection between the entry and a user providing the external context list. For example, a person's relevance value may be decreased if a new set of people are beginning to interact with documents and/or sites associated with the user 104 more frequently than the person. Additionally and/or alternatively, a time decay of the relevance value for each entry may be implemented. For example, a person's relevance value may be continuously decreased if the person has not interacted with documents and/or sites associated with the user 104 over a particular period of time.

The search service 114 may then perform the query, where a search index comprising items may be returned in response to performance of the query. The items may contain or may be related to terms specified in the query, and may include items the user 104 has created or interacted with, items on sites the user 104 visits, items trending around the user 104, and items created by other users associated with the user 104. In one embodiment, the search service 114 may execute the query at an internal search engine 122 of the search service 114. In another embodiment, the search service 114 may provide the query to an external search engine 124 for execution. The external search engine 124 may execute the query and provide the search index to the search service 114. The search index may be populated with properties of the items by indexing the properties of the items as metadata on the respective items within the search index. The rank determination module 118 may then be configured to match entries in the external context list against associated properties of the items within the search index, compute a score for the items based on the matching, and rank results of the query based on the score computed for the items. Continuing with the same illustrative example, the rank determination module 118 may match the people within the external context list against associated item properties such as author, created by, and modified by properties of a document. If there is a match between a person and an associated item property, the rank determination module 118 may compute the score based on the relevance value for the person and a weight of the associated item property. For example, one of the people in the external context list may be John Doe, who has a relevance value of 3.2. John Doe may be the author of a document within the search index, where the author property has an associated weight of 0.5. The rank determination module 118 may compute a score for that document based on the match, where the score for the document may be computed by multiplying the relevance value of John Doe (3.2) by the weight of the associated item property (0.5), yielding a score of 1.6. The document may then be ranked among other items within the query based on the score.

In some examples, the search service 114 may be configured to validate the ranked results. The search service 114 may then be configured to provide the ranked results for display through a user interface of the application 106. The results may be displayed such that items and the associated properties of those items that matched the entries of the external context list are displayed (e.g, the document and author property of the document in the example provided above). The user 104 may be enabled to interact with the ranked results through the user interface. For example, the user 104 may filter the ranked results to more easily find items of interest and/or navigate to an item displayed within the ranked results. In some embodiments, only items with a computed score over a particular threshold score may be provided within the ranked results to ensure that the user 104 is provided with the most relevant items.

Conventionally, a user may only be enabled to search for items in specific locations, like a given folder or collaboration site, which requires the user to know and remember in which location the items were stored. However, users are most likely to search for items "around" them (that is, more than just items they've created themselves) such as items which are created by other users they work closely or collaborate with, items associated with projects/tasks they have worked on, and/or items on sites they often frequent. For such items, it is unlikely that the user knows a location at which the items were stored. Therefore, embodiments as described in FIG. 1 above, are directed to ranking query results for relevance based on external context to allow users to more quickly and efficiently search for relevant items around them. In addition to improving usability and increasing user efficiency, utilizing external context lists to rank query results for relevance, along with implementation of the threshold score, may decrease an amount of relevant query results (amount of data) provided from the search service to a client, thereby reducing processor and memory usage along with bandwidth usage due to reduced device-to-server communications. Moreover, the validation performed on the ranked results may enhance reliability.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of items created by multiple users and stored at various locations, which a user may want to be able to effectively search for.

Figure 2:
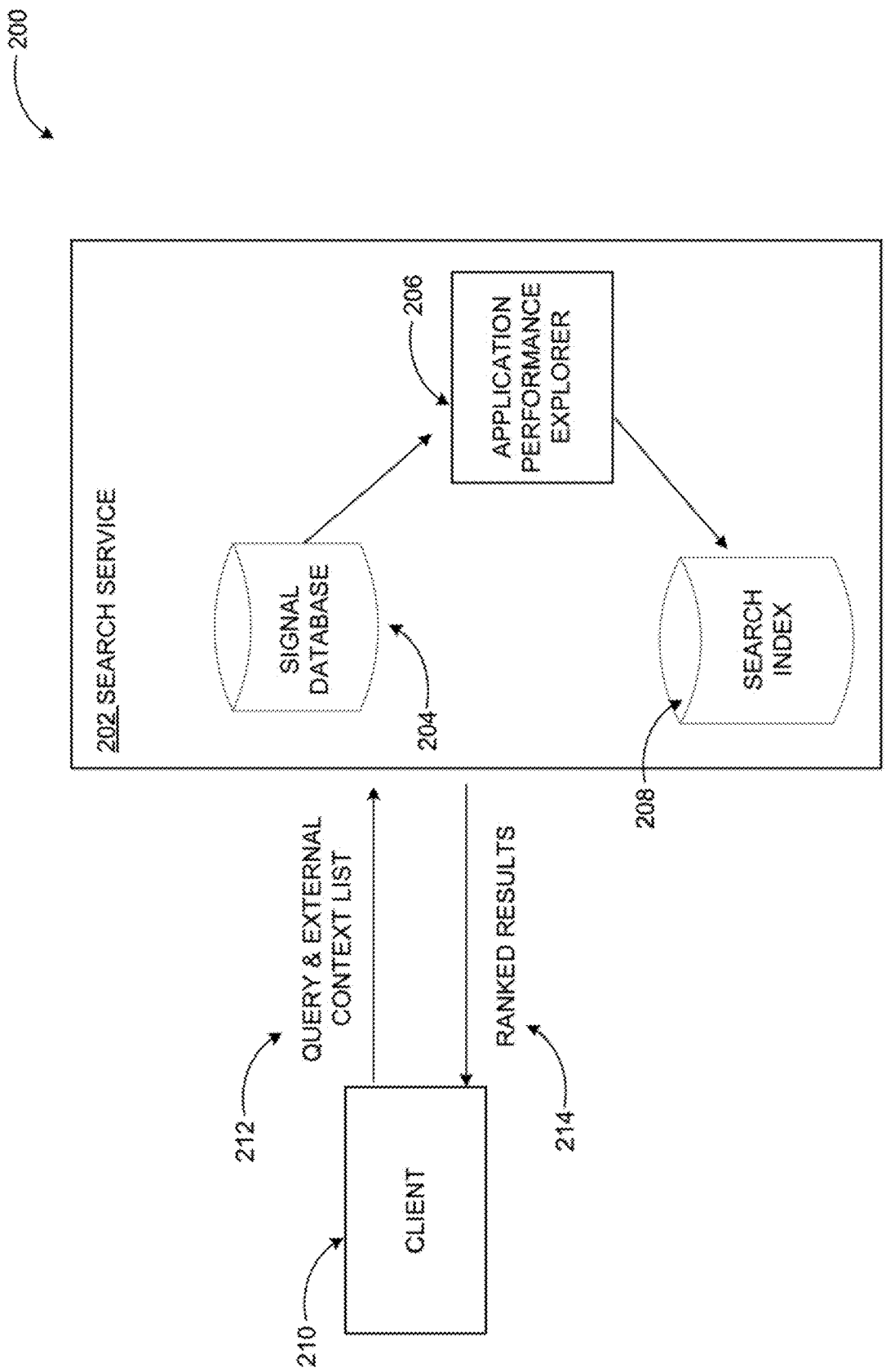
FIG. 2 illustrates an example architecture for a system configured to rank query results for relevance based on external content.

FIG. 2 illustrates an example architecture for a system configured to rank query results for relevance based on external content. As shown in a diagram 200, a search service 202 may be configured to interact with a client 210 to rank query results for relevance based on external content. The search service 202 may receive a query and an external context list 212 from the client 210. The external content list may be generated by the client 210 and may be comprised of entries that include people, teams, groups, organizations, sites, or tags. Either the client 210 or the search service 202 may determine a relevance value for each entry in the external context list based on an order of connection, or closeness, between the entry and a user requesting the query through the client 210. If the client 210 determines the relevance value, then the relevance values may be provided to the search service 202 in conjunction with the query and the external context list 212. The search service 202 may then perform the query, where a search index 208 comprising items that contain or may be related to terms specified in the query may be returned in response to performance of the query.

The search service 202 may also receive input signals associated with items, such as total view count, recent activity, and click streams (that is, search terms that ended up in a selection of an item from query results), where the input signals are stored in a signal database 204. Items for which the input signals are received may include items the user has created or interacted with, items on sites the user visits, items trending around the user, and items created by other users associated with the user, for example. An application performance explorer (APE) 206 may be configured to populate the search index 208 with properties of the items based on the input signals received. The APE 206 may populate the search index 208 by indexing the properties of the items as metadata on the respective items within the search index 208, for example. The APE 206 may be configured to populate the search index at least once a day.

After performance of the query, the search service 202 may match entries in the external context list against associated properties of the items within the search index 208. The search service 202 may compute a score for the items based on the matching, and rank results of the query based on the score computed for the items. For example, in response to a determination that an associated property of an item matches an entry of the external context list, a pre-assigned weight of the associated property may be multiplied by a relevance value determined for the entry of the external context list to compute the score for that item. The search service 202 may then provide the ranked results 214 to the client 210 for display. In some embodiments, only items that have a computed score over a particular threshold score may be provided within the ranked results 214.

In an example scenario, the search service 202 may receive a query and an external context list, along with relevance values for each entry of the external context list, from the client 210. The external context list may comprise people as entries from the client, and the relevance value for each entry may be based on an order of connection, or closeness, between the person and the user requesting the query through the client 210. For example, person 1 may have a closest relationship with the user and thus the highest relevance value of 3.2, followed by person 2 who may have a relevance value of 3.0, person 3 who may have a relevance value of 2.7, and person 4 who may have a relevance value of 2.4. The search service 202 may then perform the query, where the search index 208 comprising items that contain or may be related to terms specified in the query may be returned in response to performance of the query. The search service 202 may then match entries in the external context list against associated properties of the items within the search index 208, and compute a score for the items based on the matching. For example, an item within the search index may be a document including properties such as author, created by, and modified by, where the author and created by properties match person 1 and the modified by property matches person 2. The author and created by properties may have a pre-assigned weight of 0.5, and the modified by property may have a pre-assigned weight of 0.2. Therefore, the score for the document may be computed as follows:

Score=[relevance value of person1*(weight of author property+weight of created by property)]+(relevance value of person2*weight of modified by property]=[3.2*(0.5+0.5)]+(2.7*0.2)=3.74.

The document may then be ranked among other items based on the score.

Figure 3:
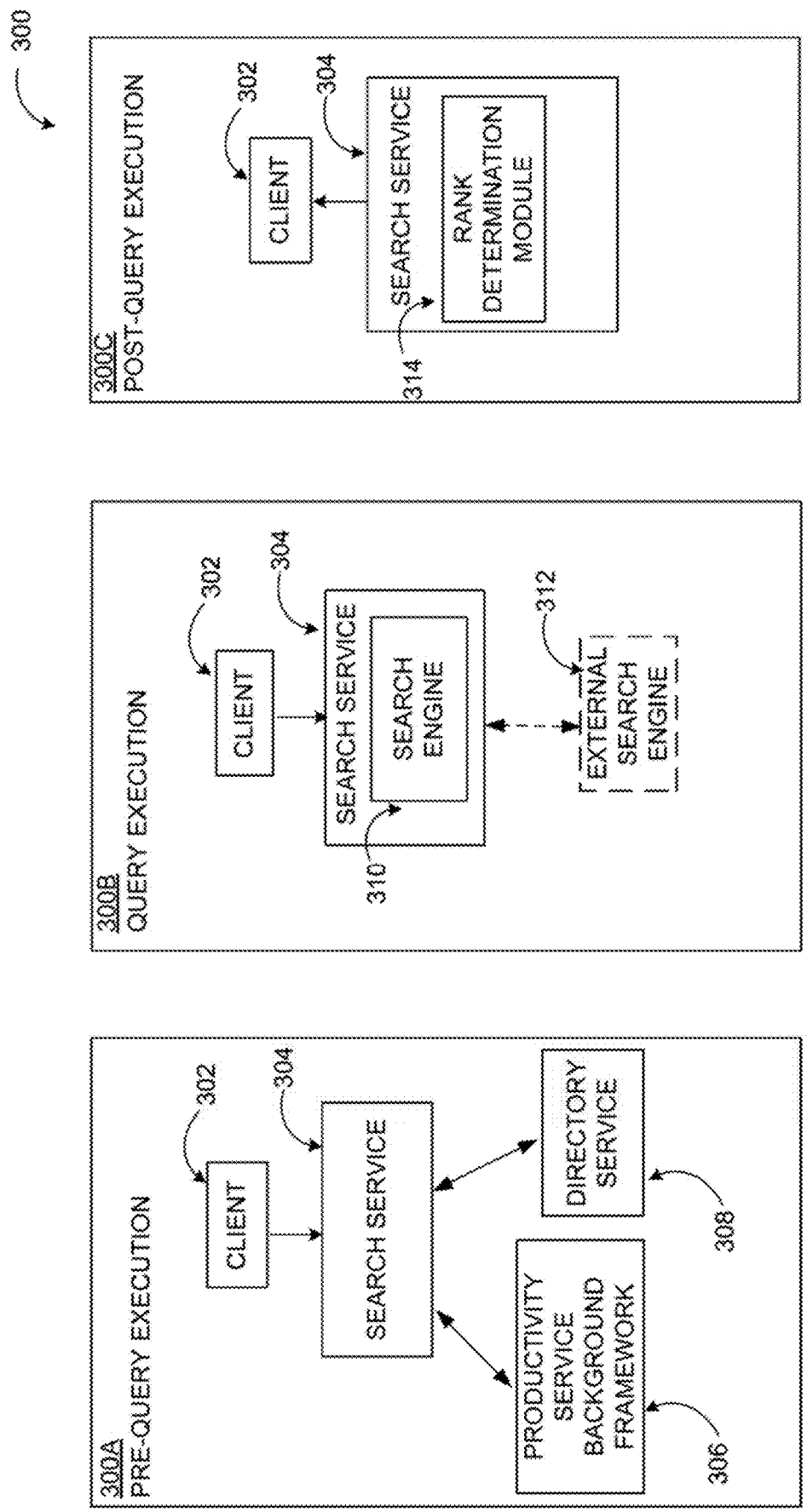
FIG. 3 illustrates example architecture throughout three phases of a process to rank query results for relevance based on external context.

FIG. 3 illustrates example architecture throughout three phases of a process to rank query results for relevance based on external context. As shown in a diagram 300, a search service 304 may be configured to interact with a client 302 to rank query results for relevance based on external content. The process to rank query results for relevance based on external content may be divided into three phases, pre-query execution, query execution, and post-query execution, and each phase may implement a different architecture as illustrated in configurations 300A, 300B, and 300C, respectively.

The client 302 may provide a query and one or more external context lists to the search service 304. The external context list(s) may be provided as part of the query or as a separate list. The search service 304 may determine a relevance value for each entry of the external context list(s), where the entries may include people, groups, teams, organizations, sites or tags. As shown in configuration 300A, the search service 304 may retrieve information associated with the entries from one or more services, such as a productivity service background framework 306 and a directory service 308 to determine the relevance value for each entry, where the relevance value may be based on an order of connection, or closeness of relationship, between the entry and a user associated with the client 302. For example, the search service 304 may retrieve information associated with people interacting with the user and/or people interacting with sites or items related to the user from the directory service 308. The search service 304 may also retrieve information associated with items trending around the user, items the user has modified or viewed, sites frequented by the user, and/or trending sites from the productivity service background framework 306.

The search service 304 may then perform the query, where a search index may be returned in response to performance of the query. The search index may comprise items that contain or are related to the terms specified in the query. The query may be executed at a search engine 310 of the search service 304 or may be provided to an external search engine 312 for execution as shown in configuration 300B. The search index may be populated, by an application performance explorer (APE) executing in the search service 304, with properties of the items by indexing the properties of the items as metadata on the respective items within the search index.

As shown in configuration 300C, after the query is executed, a rank determination module 314 of the search service 304 may be configured to match entries in the external context list(s) against associated properties of the items within the search index, compute a score for the items based on the matching, and rank results of the query based on the score computed for the items. In some examples, the search service 304 may be configured to validate the ranked results. The rank results may be validated by one or more of extracting relevancy based data associated with the entry and/or item properties from cached files of the APE, querying the productivity service background framework to retrieve the relevancy based data, and/or calling an application programming instance (API) of the directory service to retrieve the relevancy based data. The search service 304 may then provide the ranked results to the client 302 for display. The results may be displayed such that the score and the associated properties of the items that matched the entries of the external context list(s) are displayed.

Figure 4:
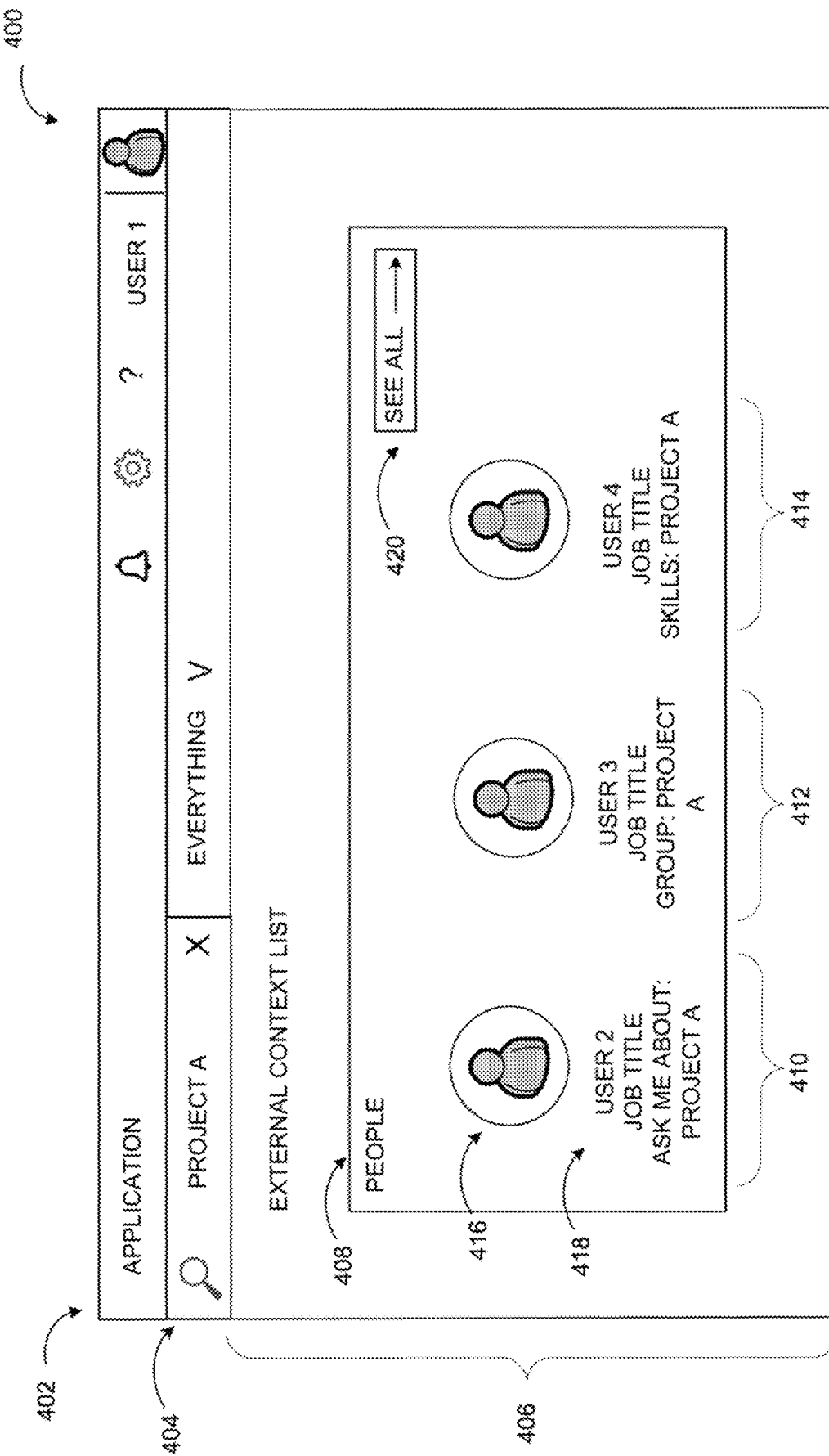
FIG. 4 includes an example user experience configuration for display of an external context list.

FIG. 4 includes an example user experience configuration for display of an external context list. A computing device associated with a user may be configured to execute an application (or client) associated with a search service, where the computing device may comprise a communication interface to facilitate communication between the search service and the computing device, a memory to store instructions, and one or more processors coupled to the memory. The processors, in conjunction with the instructions stored on the memory, may be configured to generate an external context list to enable relevance ranking of query results based on external context.

As shown in a diagram 400, a user may provide terms for a query through a user experience 402 of the application. For example, the user experience 402 may include a search tool bar 404 that enables the user to provide terms for the query using one or more input devices of the computing device. The input devices may enable one or more of keyboard input, a mouse input, a pen input, a touch, an optically captured gesture, a voice input, a gyroscopic input, and/or an eye-tracking input, for example. As illustrated, the user may enter the query terms "Project A" into the search tool bar 404 through the user experience 402 to search for items associated with "Project A". The user may further define the query such that the results comprise items directly related to the user, items closely related to the user, and/or any item that contains or is related to the terms of the query, "Project A," through the search tool bar 404. As illustrated by selection of "Everything" in the search tool bar 404, the query may be defined such that the results comprise any item that contains or is related to the terms of the query "Project A," through the search tool bar 404.

In response to the user entry of query terms, an external context list 406 comprising one or more entries 410, 412, 414 may be displayed through the user experience 402. For example, the entries 410, 412, 414 of the external context list 406 may be people 408 that are associated with the provided query terms, "Project A". As illustrated, the external context list 406 may be displayed horizontally in a left to right direction. Alternatively, the external context list 406 may be displayed vertically in a top to bottom direction. In some embodiments, the order in which the entries 410, 412, 414 are displayed may be based on an order of connection, or closeness of relationship between each entry and the user requesting the query. For example, if relevance values of each entry have been previously determined by the application, then the entries 410, 412, 414 may be displayed based on the relevance values. In order to accommodate a display size of the computing device, the user experience 402 may be configured to display only a portion of the external context list 406 and provide a control command, such as command 420, or a scroll function, for example, to enable the user to access the remaining portion of the external context list 406.

Each entry of the external context list 406 may include an icon 416 representing the entry (e.g., a photograph of the person) and information 418 associated with the entry, including a relationship between the entry of the external context list 406 and the query terms. For example, the relationship between entry 412 and the query terms "Project A" is that the person represented by entry 412 is in a group that is somehow associated with the Project A. The information 418 may also include other information associated with the entry. For example, when the entries are people 408, as illustrated, additional information may include a job title, skills, and/or location of each person. In some embodiments, the relationship between the entry of the external context list 406 and the query terms may be highlighted. In some embodiments, the user may be enabled to modify and/or add additional entries to the external context list 406 through the user experience 402.

The computing device may then provide the query and the external context list 406 to the search service. In some embodiments, the external context list 406 is provided to the search service as an integrated part of the query. In other the embodiments, the external context list 406 may be provided to the search service separately from the query. Upon receipt, the search service may determine a relevance value for each entry in the external context list, if not already done so by the application, and perform the query, where a search index comprising items may be returned in response to performance of the query. The search service may then match entries in the external context list against associated properties of the items, compute a score for the items based on the matching, and rank results of the query based on the score computed for the items. The search service may then provide the ranked results to the computing device to be displayed through the user experience 402.

In an alternate embodiment, the query may be provided to the search service without the external context list. Therefore, the search service may perform the query and provide results to the computing device, where the results are solely based on the items of the search index returned in response to the performance of the query. The application may then be configured to apply the external context list to rank the results locally. For example, the application may be configured to determine a relevance value for each entry in the external context list by retrieving locally stored information on the computing device associated with each entry of the external context list. The application may then match entries in the external context list against associated properties of the items within the results, compute a score for the items based on the matching, and rank results of the query based on the score computed for the items.

Figure 5A:
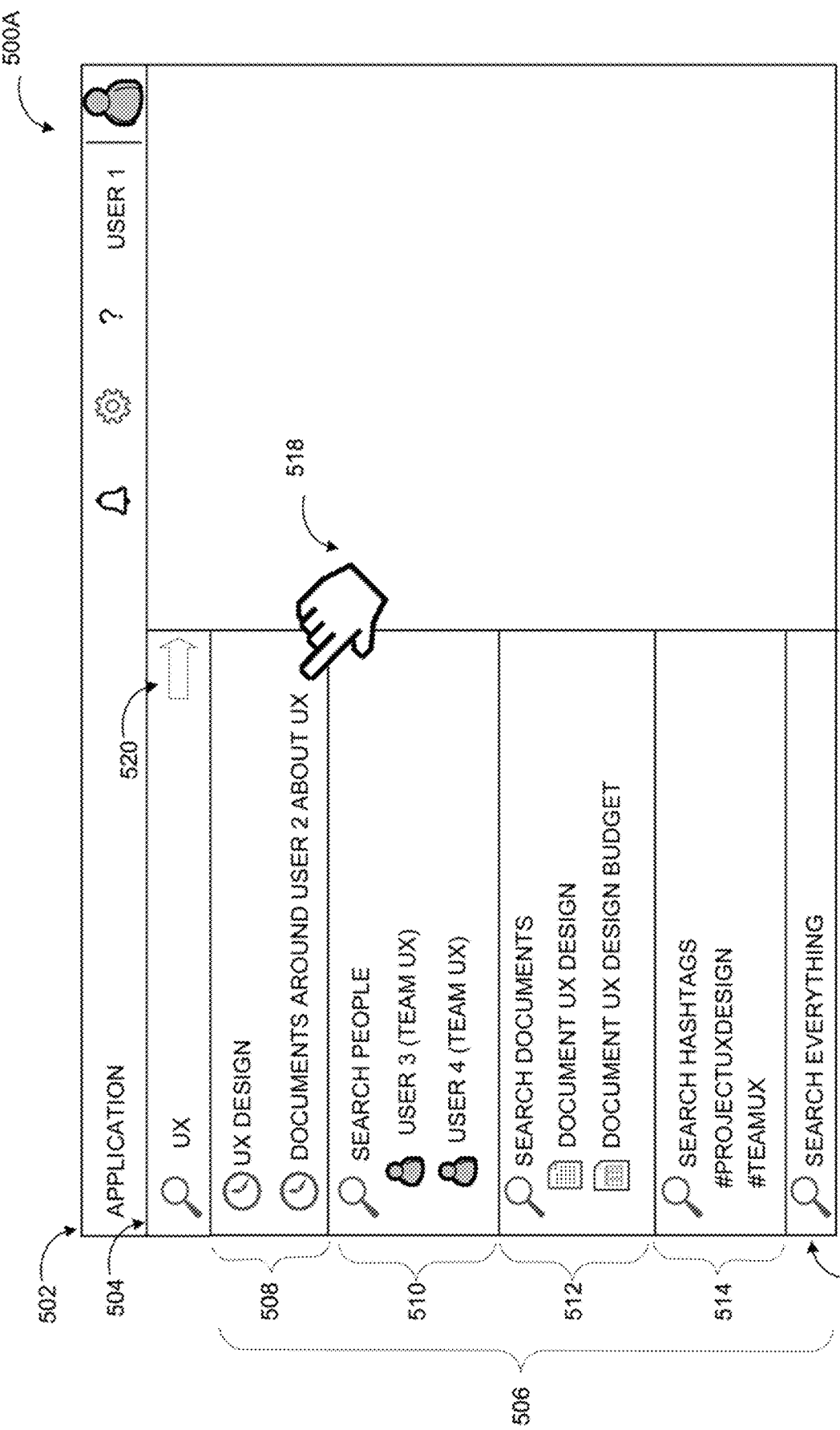
FIGS. 5A-B include other example user experience configurations for interaction with a query such that results of the query may be ranked for relevance based on external content.
Figure 5B:
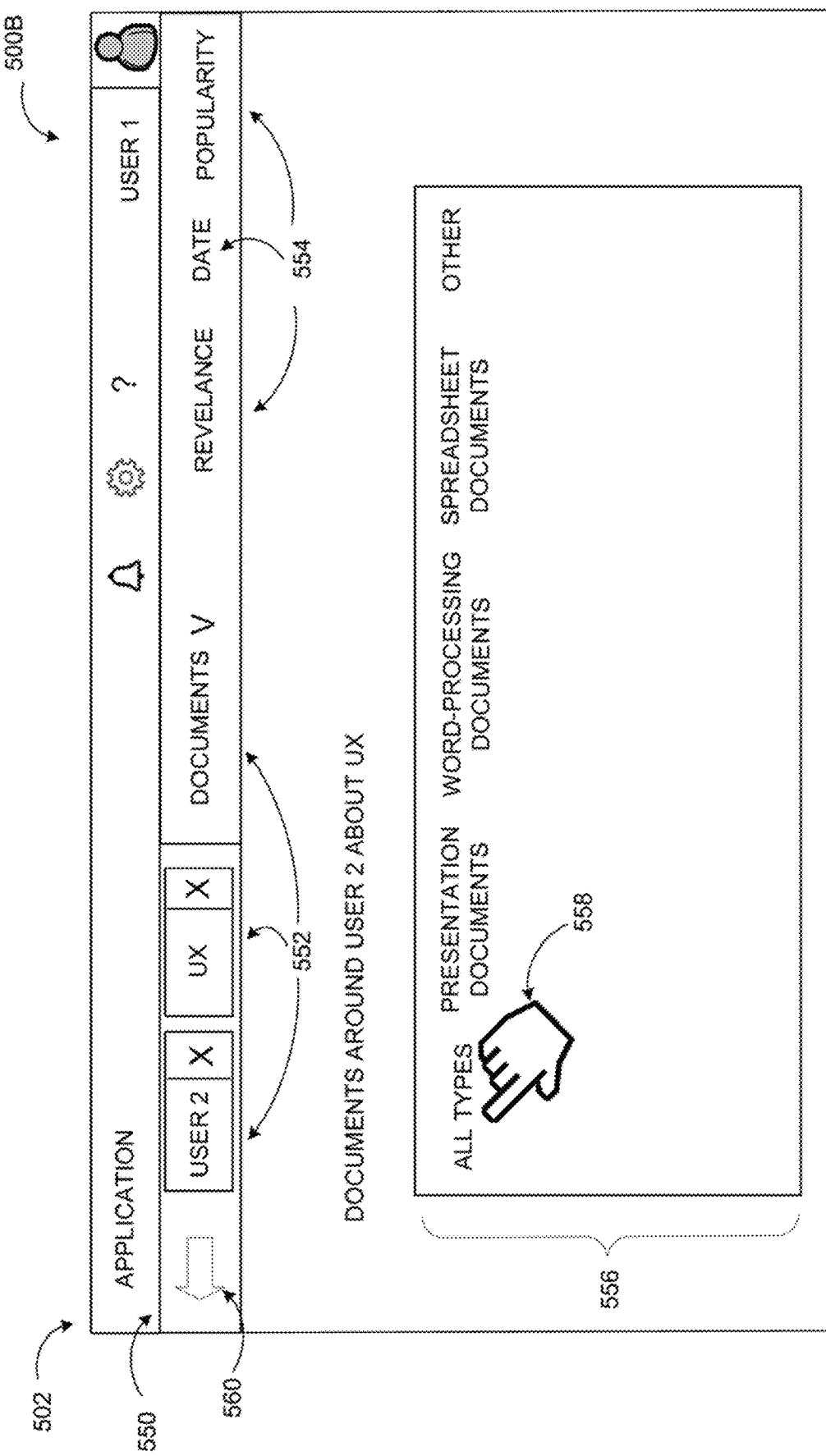

FIGS. 5A-B include other example user experience configurations for interaction with a query such that results of the query may be ranked for relevance based on external content. As previously discussed in conjunction with FIG. 4, a computing device associated with a user may be configured to execute an application associated with a search service, where the computing device may comprise a communication interface to facilitate communication between the search service and the computing device, a memory to store instructions, and one or more processors coupled to the memory. The processors, in conjunction with the instructions stored on the memory, may be configured to provide a query and an external context list to the search service to enable relevance ranking of query results based on external context.

As shown in a diagram 500A of FIG. 5A, a user may provide terms for a query through a user experience 502 of the application. For example, the user experience 502 may include a search tool bar 504 that enables the user to provide terms for the query using one or more input devices of the computing device. The input devices may enable one or more of keyboard input, a mouse input, a pen input, a touch, an optically captured gesture, a voice input, a gyroscopic input, and/or an eye-tracking input, for example. As illustrated, the user may begin to enter the query term "UX" into the search tool bar 504 through the user experience 502. In response, an additional search menu 506 may be displayed. The search menu 506 may be a drop down menu, a pop-up menu, a fly-out menu, and/or a separate display window, among other examples. The search menu may include the most recent query terms requested by the user that included the term "UX" 508. The search menu 506 may also include options to search based on different contexts, such as people associated with the term "UX" 510, documents including the term "UX" 512, and hashtags including the term "UX" 514, for example. The search menu 506 may additionally provide an option to search everything 516 (that is people, items, documents, and hashtags, among other contexts) associated with the term "UX." A user may first select 518 an option (e.g., Documents around User 2 about UX) presented in the search menu 506 under the most recent query terms requested by the user that included the term "UX" 508. The selected option defines a context of documents and people (specifically User 2), in addition to the query terms of "UX." The user may then select a next command 520, which may be graphically and/or textually represented in the user experience 502.

In response, the user experience 502 may be configured to display an advanced search tool bar 550 to enable the user to further limit results to be provided by the query, as shown in diagram 500B of FIG. 5B. The advanced search tool bar 550 may display the current context and terms selected for the query 552, including "User 2" and "UX" and "Documents." The advanced search tool bar 550 may also provide additional options 554 that may enable a user to limit the results of the query based on relevance, date and/or popularity. In some embodiments, in response to a user selection of a documents based context, an additional menu 556 may be provided through the user experience 502 to enable the user to select particular type of documents around User 2 and about UX to be returned in the results of the query. For example, the user may select to have only presentation or word-processing documents around User 2 and about UX returned. Alternately, the user may select 558 to have all types of documents around User 2 and about UX returned, as illustrated. Once the user has made further selections utilizing the advanced search tool bar functions and/or if the user does not need to make any further changes to the query context and/or terms, the user may select a back command 560, which may be graphically and/or textually represented in the user experience 502.

The computing device may then be configured to provide the query and one or more external context lists to the search service. One external context list may include people as entries, where the people are associated with User 2. Another external context list may include sites as entries, where the sites have been frequented by the User 2 or people associated with User 2. In some embodiments, the external context list(s) may be provided to the search service as an integrated part of the query. In other the embodiments, the external context list(s) may be provided to the search service separately from the query. Upon receipt, the search service may determine a relevance value for each entry in the external context list (as described in detail in FIG. 3), and perform the query, where a search index comprising items may be returned in response to performance of the query. The items may include documents around User 2 about UX, such as UX documents created or modified by User 2, UX documents trending around User 2, UX documents by peers or collaborators associated with User 2, or sites User 2 works on. The search service may then match entries in the external context list against associated properties of the items, compute a score for the items based on the matching, and rank results of the query based on the score computed for the items. The search service may then provide the ranked results to the computing device to be displayed through the user experience 502.

In some embodiments, the ranked results may be displayed as blocks through the user experience 502, where a user may select the blocks to navigate to the items. In one example, the blocks may be a fixed size and a fixed order. In another example, the blocks may be of a variable size and a fixed or variable order, where the size and/or the order of the blocks may depend on a number of query results. Alternately, the ranked results may be displayed as containers with selectable result items within each container through the user experience 502.

The examples provided in FIGS. 1 through 5A-B are illustrated with specific systems, architectures, services, applications, modules, and user experiences. Embodiments are not limited to environments according to these examples. Relevance ranking of query results based on external context may be implemented in environments employing fewer or additional systems, architectures, services, applications, modules, and user experiences. Furthermore, the example systems, architectures, services, applications, modules, and user experiences shown in FIGS. 1 through 5A-B may be implemented in a similar manner with other values using the principles described herein.

Figure 6:
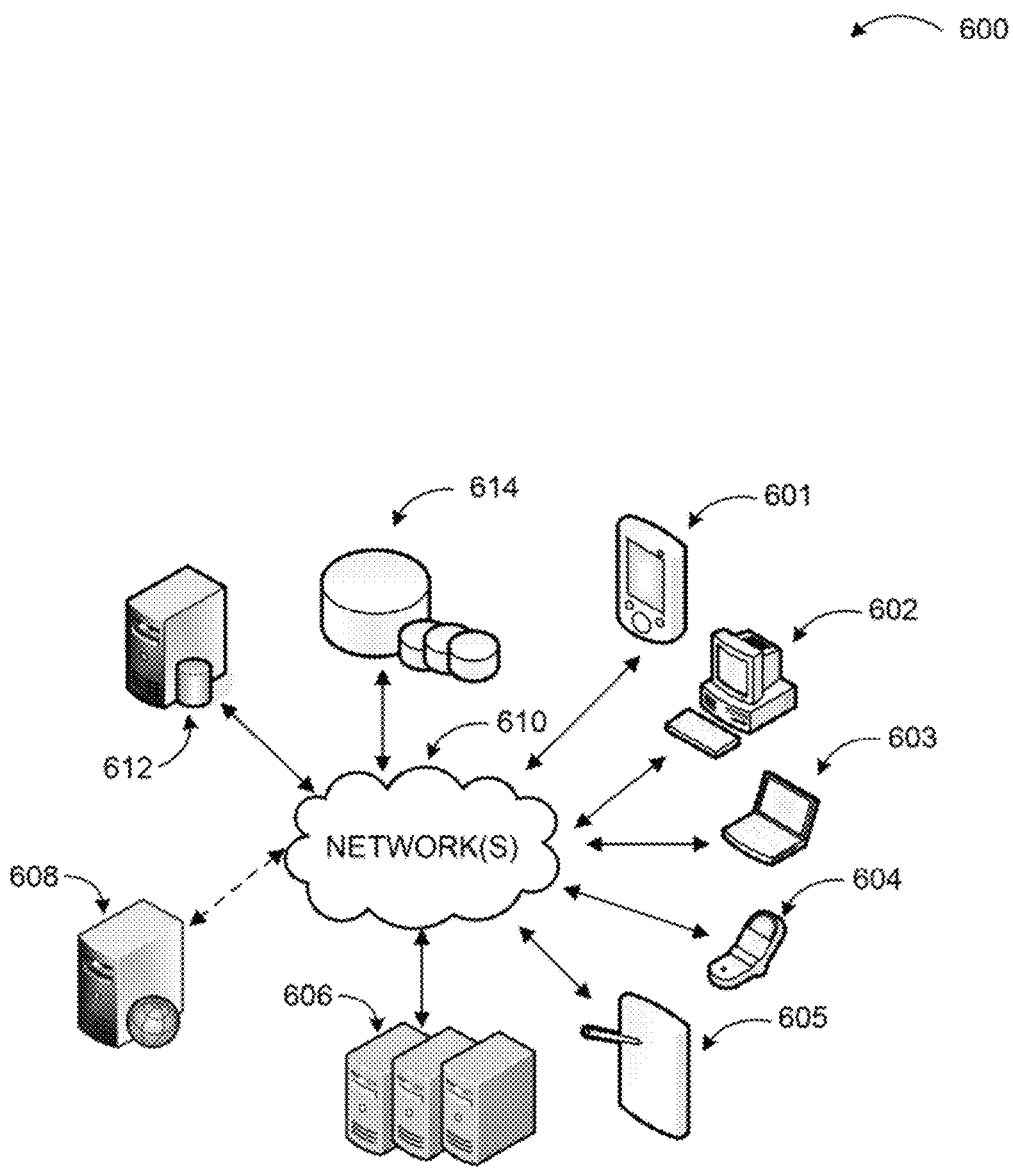
FIG. 6 is a networked environment, where a system according to embodiments may be implemented.

FIG. 6 is a networked environment, where a system according to embodiments may be implemented. In addition to locally installed applications (for example, application 106 or client 210, 302), a rank determination module may also be employed in conjunction with hosted applications and services (for example, a search service 114, 202, or 304) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, and modules may be employed to rank search results for relevance based on external context. Furthermore, the networked environments discussed in FIG. 6 are for illustration purposes only. Embodiments are not limited to the example services, applications, engines, modules or processes.

Figure 7:
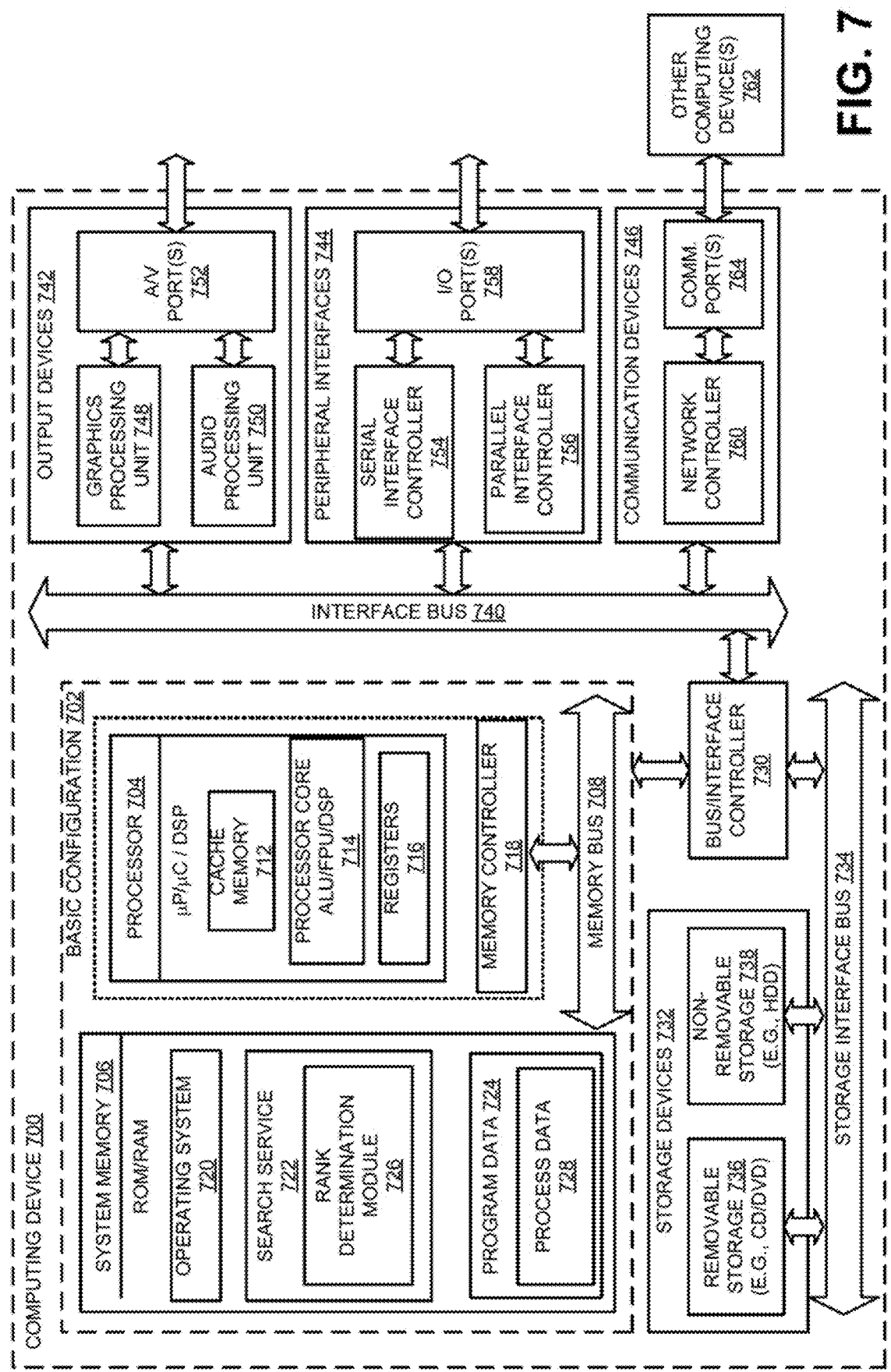
FIG. 7 is a block diagram of an example general purpose computing device, which may be used to rank query results for relevance based on external content.

FIG. 7 is a block diagram of an example general purpose computing device, which may be used to rank query results for relevance based on external context.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a search service 722, and program data 724. The search service 722 may include a rank determination module 726, which may be an integrated module of the search service 722. The search service 722 may be configured to receive a query and an external context list, determine a relevance value for each entry in the external context list, and perform the query, where a search index comprising items may be returned in response to performance of the query. The rank determination module 726 of the search service 722 may then be configured to match entries in the external context list against associated properties of the items, compute a score for the items based on the matching, and rank results of the query based on the score computed for the items. The program data 724 may include, among other data, process data 728, such as the query terms, the external context list and relevance values for each entry of the external context list, and computed scores, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to rank search results for relevance based on external context. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
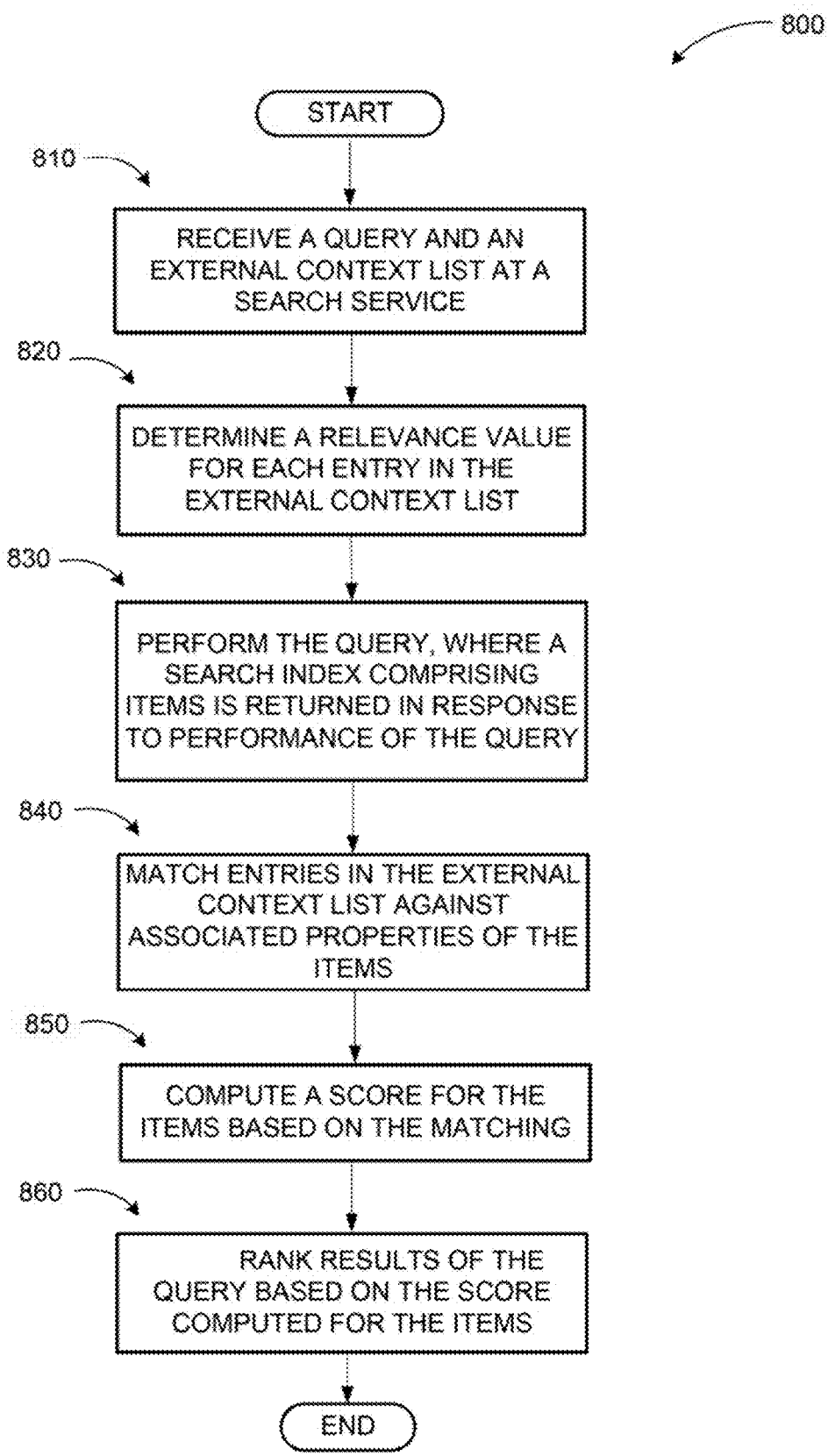
FIG. 8 illustrates a logic flow diagram of a method to rank query results for relevance based on external content.

FIG. 8 illustrates a logic flow diagram of a method to rank query results for relevance based on external context.

Process 800 may be implemented on a computing device, server, or other system. An example system may include a server configured to execute a search service provided to enable a user to effectively search for items via queries. The server may comprise a communication interface to facilitate communication between the search service and a device on which an application associated with the search service is executed, a memory to store instructions, and one or more processors coupled to the memory. The processors, in conjunction with the instructions stored on the memory, may be configured to rank query results for relevance based on external context.

Process 800 begins with operation 810, where the search service may receive a query and an external context list from the device. The external content list may be comprised of entries that include people, teams, groups, organizations, sites, or tags. At operation 820, the search service may determine a relevance value for each entry in the external context list. The relevance value may be based on an order of connection, or closeness of relationship, between the entry and a user requesting the query. The relevance value may be determined based on information retrieved from one or more services, such as a directory service, a collaboration service, a communication service, and/or a productivity service background framework. In some embodiments, the relevance value for an entry of the external context list may be modified in response to detecting a change in connection between the entry and the user. Additionally and/or alternatively, a time decay of the relevance value for each entry may be implemented.

At operation 830, the search service may perform the query, where a search index comprising items may be returned in response to performance of the query. The search service may execute the query at an internal search engine of the search service. Alternatively, the search service may provide the query to an external search engine for execution. The external search engine may then execute the query and provide the search index comprising the items to the search service. The items may contain or may be related to terms specified in the query, and may include items a user requesting the query has created or interacted with, items on sites the user visits, items trending around the user, and/or items created by other users associated with the user. The search index may be populated with properties of the items by indexing the properties of the items as metadata on the respective items within the search index.

At operation 840, the search service may match entries in the external context list against associated properties of the items. At operation 850, the search service may compute a score for the items based on the matching. For example, a score for an item may be based on the relevance value for a entry that matches an associated property of the item and a pre-assigned weight of that associated item property. At operation 860, the search service may rank results of the query based on the score computed for the items, where the ranked results may then be provided to the device for display. In some embodiments, only items that have a score over a particular threshold score may be provided within the ranked results to ensure that the user is provided with truly relevant items.

The operations included in process 800 are for illustration purposes. Ranking of search results for relevance based on external context may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

Figure 9:
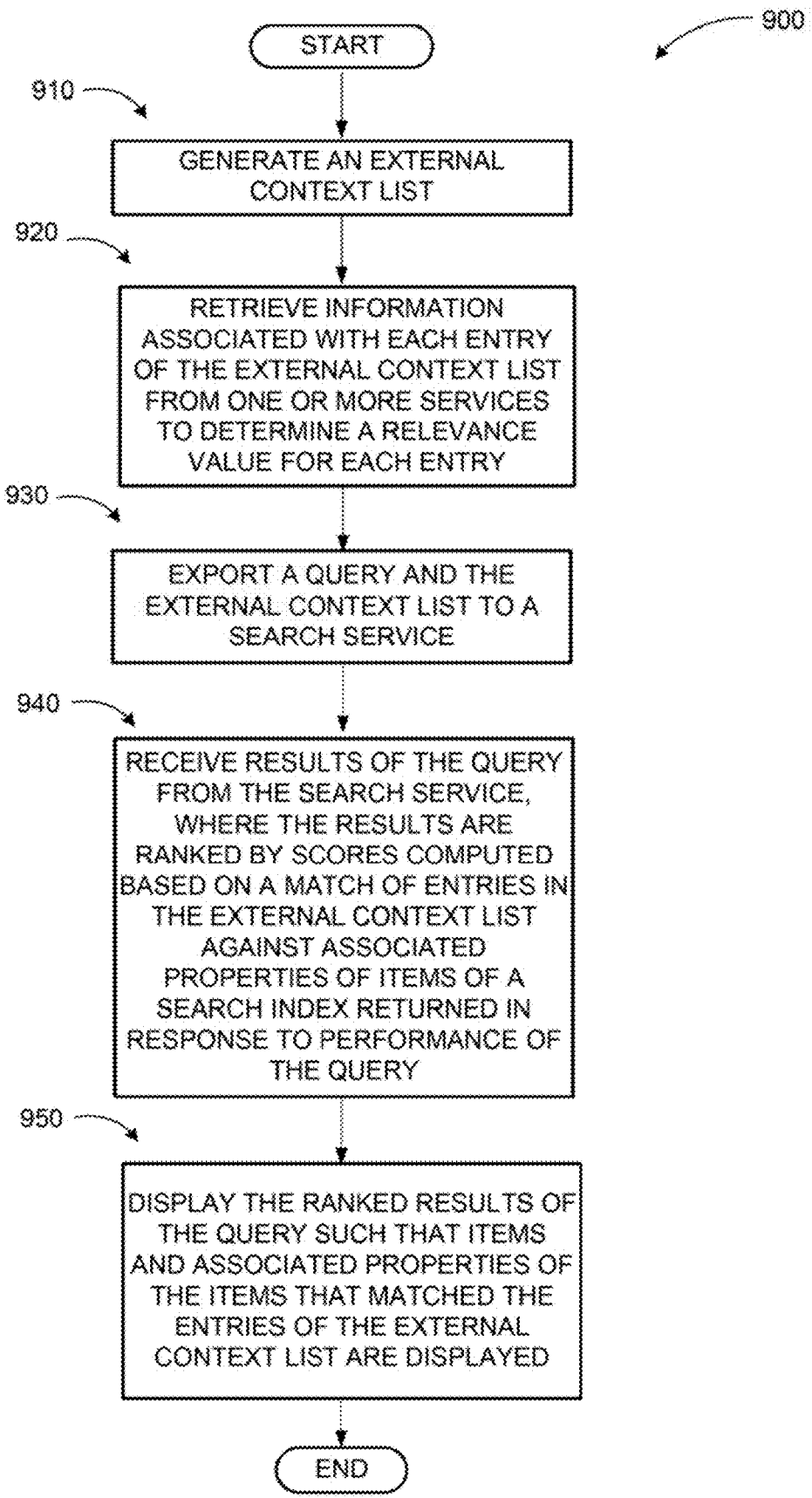
FIG. 9 illustrates another logic flow diagram of a method to rank query results for relevance based on external context, according to embodiments.

FIG. 9 illustrates a logic flow diagram of a method to rank query results for relevance based on external context.

Process 900 may be implemented on a computing device, server, or other system. An example system may include a computing device configured to execute an application (or client) associated with a search service. The computing device may comprise a communication interface to facilitate communication between the search service and the computing device, a memory to store instructions, and one or more processors coupled to the memory. The processors, in conjunction with the instructions stored on the memory, may be configured to generate an external context list to enable relevance ranking of query results based on external context.

Process 900 begins with operation 910, where the processors may generate an external context list comprising entries. In some examples, the processors may generate more than one external context list. The entries may include people, teams, groups, organizations, sites, or tags. At operation 920, the processors may retrieve information from one or more services executing on the computing device to determine a relevance value for each entry. The relevance value may be based on an order of connection, or closeness of relationship, between the entry and a user associated with the computing device.

At operation 930, the processors may export a query and the external context list to the search service. The external context list may be exported as a part of the query or as a separate component to the search service. At operation 940, results of the query may be received by the processors from the search service. The query results may be ranked by scores computed based on a match of entries in the external context list against associated properties of items of a search index returned in response to performance of the query. At operation 950, the ranked results of the query may be displayed such that items and the associated properties of those items that matched the entries of the external context list are displayed.

The operations included in process 900 are for illustration purposes. Relevance ranking of search results based on external context may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, means to rank query results for relevance based on external context are provided. Example means may include receiving a query and an external context list at a search service, determining a relevance value for each entry in the external context list, and performing the query, where a search index comprising items may be returned in response to performance of the query. Example means may further include matching entries in the external context list against associated properties of the items, computing a score for the items based on the matching, and ranking results of the query based on the score computed for the items.

According to some examples, methods to rank query results for relevance based on external context are provided. An example method may include receiving a query and an external context list at a search service, determining a relevance value for each entry in the external context list, and performing the query, where a search index comprising items may be returned in response to performance of the query. The example method may further include matching entries in the external context list against associated properties of the items, computing a score for the items based on the matching, and ranking results of the query based on the score computed for the items.

In other examples, the relevance value for each entry may be determined based on an order of connection between each entry and a user requesting the query. A relevance value for an entry of the external context list may be modified in response to detecting a change in connection between the entry and the user. A time decay of the relevance value may be implemented for each entry. The entries in the external context list may include one of people, teams, groups, organizations, sites, and tags. The search index may be populated with properties of the items by indexing the properties of the items as metadata on the respective items within the search index. The rank of the results may be validated.

In further examples, the ranked results of the query may be provided to a client device for display through a user interface, and enabling a user requesting the query may be enabled to interact with the ranked results of the query through the user interface of the client device. In response to a determination that an associated property of an item matches an entry of the external context list, a pre-assigned weight of the associated property may be multiplied by a relevance value determined for the entry of the external context list to compute a score for the item. Information associated with each entry may be retrieved from one or more of a directory service, a collaboration service, a communication service, and a productivity service background framework to determine the relevance value. The query may be executed at a search engine of the search service. The query may be provided to an external search engine to be executed, and the search index may be received from the external search engine.

According to some embodiments, servers configured to execute a search service that ranks query results for relevance based on external context are described. An example server may include a communication interface configured to facilitate communication between the search service and a device executing an application associated with the search service, a memory configured to store instructions, and one or more processors coupled to the memory. The processors, in conjunction with the instructions stored in the memory, may be configured to receive, at the search service, a query and an external context list from the device, determine a relevance value for each entry in the external context list, and perform the search, where a search index comprising items may be returned in response to performance of the search. The processors may be further configured to match entries of the external context list against associated properties of the items, compute a score for the items based on the matching, rank results of the query based on the score computed for the items, and provide to be displayed the ranked results to the device.

In some embodiments, items and associated properties of the items that matched the entries of the external context list may be displayed within the ranked results. The external context list may be a integrated part of the query. The items may include items a user requesting the query has created or interacted with, items on sites the user visits, items trending around the user, and items created by other users associated with the user. The query may be defined such that the results comprise one or more of items directly related to a user requesting the query, items closely related to the user, and any items.

According to some examples, methods to rank query results for relevance based on external context are provided. An example method may include generating one or more external context lists, where entries in the one or more external context lists include one of people, teams, groups, organizations, sites, and tag, determining a relevance value for each entry in the one or more external context lists, and exporting a query and the one or more external context lists to a search service. The example method may also include receiving results of the query from the search service, where the results are ranked by scores computed based on a match of entries in the one or more external context lists against associated properties of items of a search index returned in response to performance of the query, and displaying the ranked results of the query such that items and the associated properties of the items that matched the entries of the one or more external context lists are displayed in order of their respective scores.

In other examples, a user may be enabled to interact with the ranked results displayed, where the interactions may include to filter the ranked results and to select an item within the results. The external context list may be enabled to be modified by a user prior to exportation to the search service.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to rank query results for relevance based on external context, the method comprising:
   receiving, at a server, a query and an external context list from a user via a client device, the external context list having data representing one or more entries each identifying a person, a team, a group, an organization, or a site associated with the user;
   determining a relevance value for each of the one or more entries in the external context list based on an order of connection or a relationship between the individual entries and the user;
   performing, by a search service, the query and generating a search index comprising items in response to performance of the query, the individual items having metadata describing properties of the individual items;
   matching the one or more entries in the external context list against the metadata describing the properties of the individual items;
   computing a score for the individual items based on the matching of the entries in the external context list against the metadata describing the properties of the individual items; and
   transmitting to and surfacing on the client device a subset of the items in the search index each having a calculated score above a threshold and ranked based on the scores computed for the subset of items, thereby reducing processor and memory usage along with bandwidth usage due to reduced amount of communications between the server and the client device.

2. The method of claim 1 wherein determining the relevance value for each of the one or more entries in the external context list comprises:
   determining the relevance value for each of the one or more entries based on an order of connection between a person in the external context list and the user requesting the query.

3. The method of claim 2, further comprising:
   modifying a relevance value for one or more entries of the external context list in response to detecting a change in connection between the one or more entries and the user.

4. The method of claim 1, further comprising:
   implementing time decay of the relevance value for each of the one or more entries in the external context list.

5. The method of claim 1, further comprising:
   populating the search index with properties of the items by indexing the properties of the items as the metadata on the respective items within the search index.

6. The method of claim 1, further comprising:
   validating the rank of the results according to the computed scores.

7. The method of claim 1, further comprising:
   enabling the user requesting the query to interact with the ranked results of the query surfaced at the client device through a user interface of the client device.

8. The method of claim 1 wherein computing the score for the items based on the matching comprises:
   in response to a determination that an associated property of one of the items matches one of the entries of the external context list, multiplying a pre-assigned weight of the associated property by a relevance value determined for the one of the entries of the external context list to compute the score for the one of the items.

9. The method of claim 1, further comprising:
   retrieving information associated with each of the entries from one or more of a directory service, a collaboration service, a communication service, or a productivity service background framework to determine the relevance value.

10. A method performed by a computing device to rank query results for relevance, the method comprising:
    receiving, at a server, a search query and an external context list from a user via a client device, the external context list having data representing one or more entries individually identifying a person, a team, a group, an organization, or a site; and
    in response to receiving the search query, at the server, querying a database to generate a search index according to the received search query, the search index comprising one or more items having metadata identifying one or more attributes of the individual items;
    determining, whether the one or more attributes of the individual items match any of the one or more entries in the external context list;

in response to determining that one of the attributes of one of the items matches one of the entries in the external context list, increasing a ranking level of the one of the items in the search index over other items in the search index; and transmitting to and surfacing on the client device a subset of the items in the search index each having a ranking level above a threshold.

11. The method of claim 10 wherein:
the one of the item is a document;
the metadata of the one of the items identifies an author of the document, a person created the document, or a person last modified the document; and
determining, whether the one or more attributes of the individual items match any of the one or more entries in the external context list includes determining, whether the author of the document, the person created the document, or the person last modified the document matches any of the one or more entries in the external context list.

12. The method of claim 10 wherein:
the one of the item is a document;
the metadata of the one of the items identifies a team associated with the document; and
determining, whether the one or more attributes of the individual items match any of the one or more entries in the external context list includes determining, whether the team of the document matches any of the one or more entries in the external context list each identifying a team that the user belongs to.

13. The method of claim 10 wherein:
the one of the item is a document;
the metadata of the one of the items identifies a group associated with the document; and
determining, whether the one or more attributes of the individual items match any of the one or more entries in the external context list includes determining, whether the group of the document matches any of the one or more entries in the external context list each identifying a group that the user belongs to.

14. The method of claim 10, further comprising:
in response to receiving the search query, at the server, determining a relevance value for each of the entries in the external context list based on an order of connection or a closeness of relationship between each of the entries and the user; and
wherein increasing the ranking level of the one of the items includes increasing the ranking level of the one of the items according to the relevance value of the one of the entries.

15. The method of claim 10 wherein:
one of the entries in the external context list identifies a person who interacts with the user;
the method further includes, in response to receiving the search query, at the server, determining a relevance value for the one of the entries in the external context list using time decay based on a last interaction between the person and the user; and
wherein increasing the ranking level of the one of the items includes increasing the ranking level of the one of the items according to the relevance value of the one of the entries.

16. The method of claim 10 wherein transmitting to and surfacing on the client device includes transmitting to and surfacing on the client device the subset of the items according to corresponding ranking levels.

17. The method of claim 10 wherein transmitting to and surfacing on the client device includes transmitting to and surfacing on the client device the subset of the items and identifying the one of the attributes of the one of the items that matched the one of the entries in the external context list.

18. A computing device, comprising:
a processor; and
a memory operatively coupled to the processor, the memory containing instructions executable by the processor to cause the computing device to:
receive a search query and an external context list from a user via a client device, the external context list having data representing one or more entries individually identifying a person, a team, a group, an organization, or a site; and
in response to receiving the search query,
query a database to generate a search index according to the received search query from the user, the search index including multiple items individually having metadata identifying an attribute of the corresponding item;
determine, whether the attribute of the individual items matches any of the one or more entries in the external context list;
in response to determining that the attribute of one of the items matches one of the entries in the external context list, increase a ranking level of the one of the items in the search index over other items in the search index; and
transmit to the client device a subset of the items in the search index to be surfaced at the client device, each item in the subset having a ranking level above a threshold.

19. The computing device of claim 18 wherein:
one of the items is a document;
the metadata of the one of the items identifies an author of the document, a person created the document, or a person last modified the document; and
to determine, whether the attribute of the individual items matches any of the one or more entries in the external context list includes determining, whether the author of the document, the person created the document, or the person last modified the document matches any of the one or more entries identifying a person in the external context list.

20. The computing device of claim 18 wherein the memory includes additional instructions executable by the processor to cause the computing device to:
in response to receiving the search query, at the server, determine a relevance value for each of the entries in the external context list based on an order of connection or a closeness of relationship between each of the entries and the user; and
wherein to increase the ranking level of the one of the items includes to increase the ranking level of the one of the items according to the relevance value of the one of the entries.

* * * * *